(12) United States Patent
Bloemker

(10) Patent No.: US 12,714,901 B1
(45) Date of Patent: Aug. 25, 2026

(54) FIREBOX ATTACHMENT SLEEVE

(71) Applicant: Max Fire Training, Inc., Godfrey, IL (US)

(72) Inventor: Shawn C. Bloemker, Godfrey, IL (US)

(73) Assignee: Max Fire Training, Inc., Godfrey, IL (US)

( * ) Notice: Subject to any disclaimer, the term of this patent is extended or adjusted under 35 U.S.C. 154(b) by 237 days.

(21) Appl. No.: 18/374,186

(22) Filed: Sep. 28, 2023

Related U.S. Application Data

(60) Provisional application No. 63/415,403, filed on Oct. 12, 2022.

(51) Int. Cl.
*A62C 99/00* (2010.01)
*G09B 9/00* (2006.01)

(52) U.S. Cl.
CPC ............ *A62C 99/0081* (2013.01); *G09B 9/00* (2013.01)

(58) Field of Classification Search
CPC .............................. A62C 99/0081; G09B 9/00
See application file for complete search history.

(56) References Cited

U.S. PATENT DOCUMENTS 3,897,100 A * 7/1975 Gardner .................. B60J 7/041 296/156
4,230,093 A * 10/1980 Buckner .................. F24C 1/14 292/238
4,508,098 A * 4/1985 Scheler .................. F24B 1/192 49/366
5,711,209 A * 1/1998 Guines .................... F24B 1/207 126/41 R
7,074,043 B1 * 7/2006 Jacobson ............... G09B 19/00 434/226
9,707,424 B2 7/2017 Bloemker
10,376,726 B2 8/2019 Bloemker
11,236,905 B1 * 2/2022 Holman-Thompson .................... F23G 5/448
2012/0167484 A1 * 7/2012 Bernard ............... A45C 7/0077 52/79.5
2012/0227990 A1 * 9/2012 Burnham ................. A62C 2/06 169/48
2015/0283416 A1 * 10/2015 Bloemker .......... A62C 99/0081 434/226
2018/0317707 A1 * 11/2018 Dahle ..................... F23B 60/00
2018/0347819 A1 * 12/2018 Hunter, III .............. F24B 1/195
2020/0398094 A1 * 12/2020 Bloemker .............. G09B 25/04
2023/0074532 A1 * 3/2023 Bahreinian ............. F24C 3/087
2024/0301713 A1 * 9/2024 Ramsey .................... E04H 9/14

OTHER PUBLICATIONS

Tactical Thermal Imaging, 2017, Insight Training LLC.
Exerpts from Euro Firefighter: Global Firefighting Strategy and Tactics, Command and Control and Firefighter Safety. 2008 Arthur Paul Grimwood.

* cited by examiner

*Primary Examiner* — Jack Yip
(74) *Attorney, Agent, or Firm* — Grace J. Fishel

(57) ABSTRACT

A U-shaped sleeve for attachment to metal fire box with a door opening in a front wall and a peripheral flange on a front wall above the door opening for confining smoke coming out of the firebox. The sleeve attaches to the flange without a significant air gap between the sleeve and the front wall of the firebox. The sleeve has a gated opening in a top wall and at least one gated opening in a side wall for demonstrating ventilation effects and facilitating thermal imaging training.

2 Claims, 5 Drawing Sheets

42
24
26
36

42
28
24
36

32
24
36
36
26
28

42
42
24
32
26
36

FIREBOX ATTACHMENT SLEEVE

BACKGROUND OF THE INVENTION

Field of the Invention

The present invention relates to a sleeve for attachment to a metal container such as described in U.S. Pat. No. 9,707,424, which is incorporated by reference herein, for use in demonstrating fire behavior.

Brief Description of the Prior Art

A metal container such as described in U.S. Pat. No. 9,707,424 has been used as a fire fighting training unit. The unit has an access door and a removable top through which combustible materials may be inserted. The container has at least one operable side window to demonstrate the effect of ventilation and a peripheral flange above the access door to channel smoke coming out of the firebox.

One of the contributing factors to firefighter line of duty deaths (LODDs) is uncoordinated ventilation. NIOSH has stated it as follows:

"Ventilation, whether horizontal or vertical shall be coordinated with suppression." In the past, firefighters were trained to vent early and often. However, due to the modern combustibles which consist of high heat release rate fuels, this practice must be coordinated and properly understood to prevent further loss, injury or deaths. One of the major reasons that fires get out of control is the lack of proper and adequate ventilation but vent early and vent often but this has led to problems in the field.

BRIEF SUMMARY OF THE INVENTION

In view of the above, it is an object of the present invention to provide an attachment sleeve for a metal firebox that permits more sophisticated demonstration of tactical venting and application of water to control a fire's burning regimen. Thermal imaging training is also facilitated. Other objects and features of the invention will be in part apparent and in part pointed out hereinafter.

In accordance with the invention, a sleeve for attachment to a metal container for demonstrating fire behavior is disclosed. The sleeve is a U-shaped member for attachment above a door opening in the metal container and has openings in a top wall and sidewalls for demonstrating ventilation effects and thermal imaging of the fire through the sleeve.

BRIEF DESCRIPTION OF THE SEVERAL VIEWS OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figures 1, 2, 3:
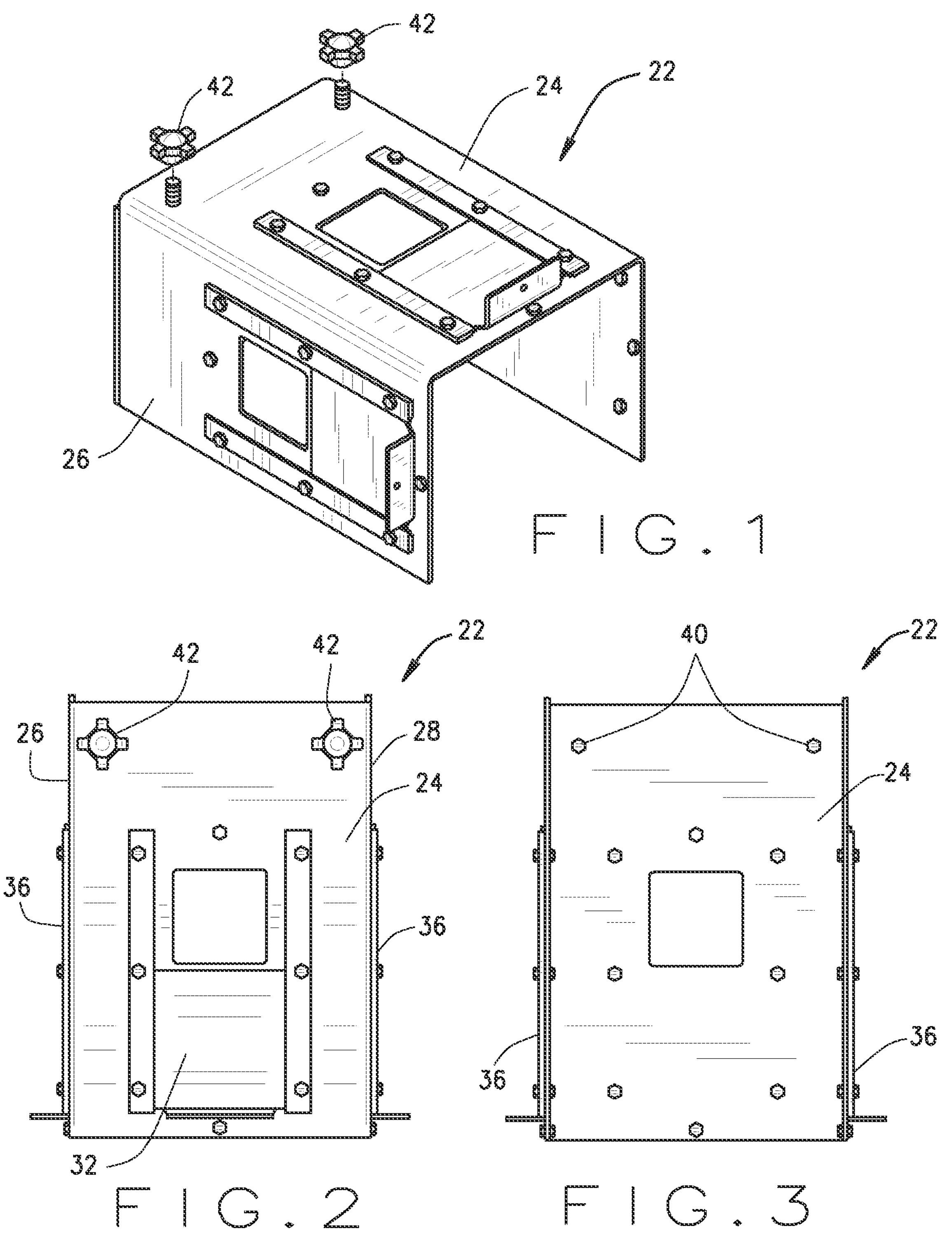
FIG. 1 is perspective view of a sleeve for attachment to a metal firebox in demonstrating fire behavior.
FIG. 2 is a top view thereof.
FIG. 3 is a top view thereof with a sliding gate and hardware for attaching the sleeve to the metal firebox removed.
Figures 4, 5, 6, 7:
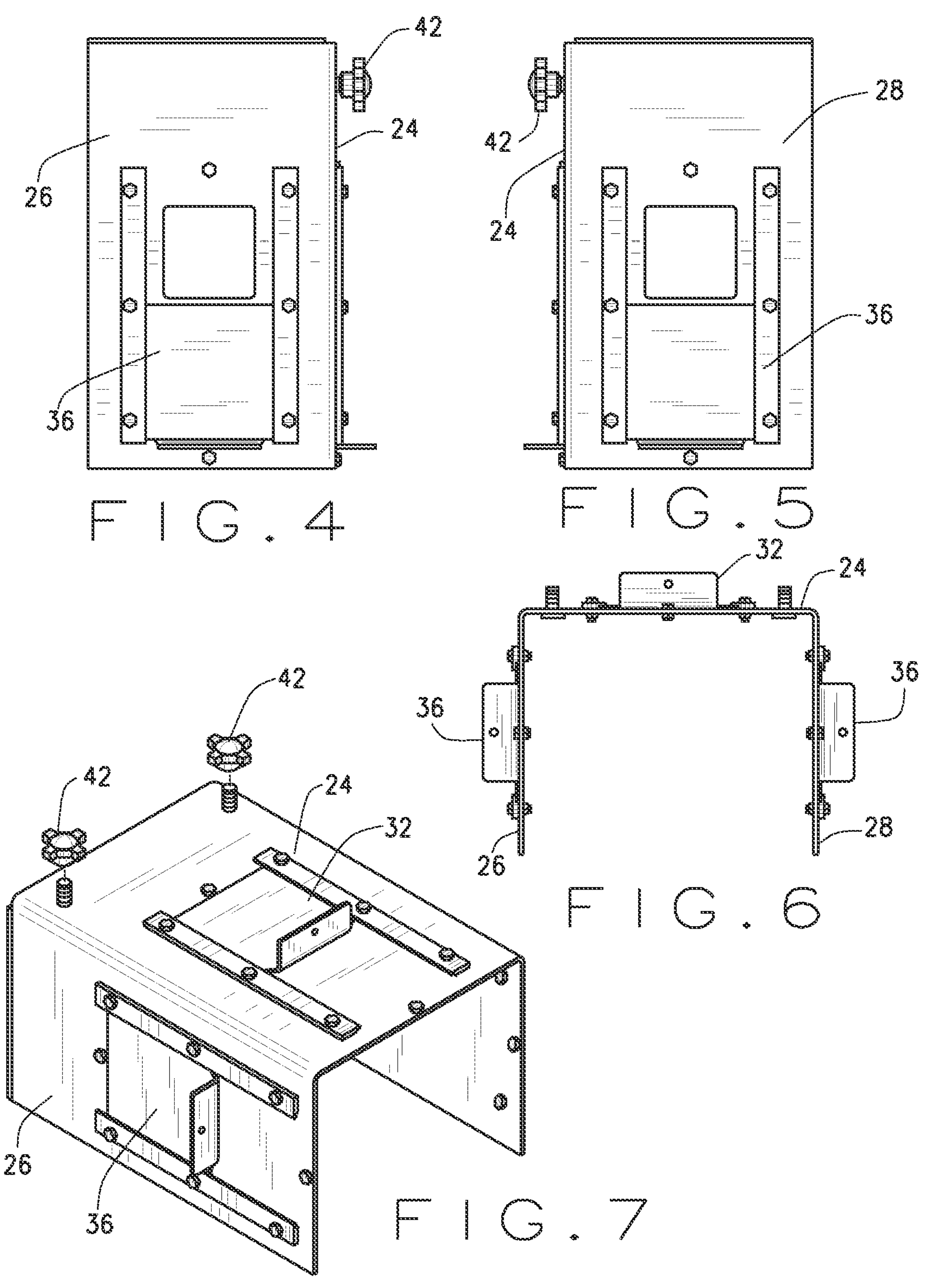
FIG. 4 is a left side elevation thereof.
FIG. 5 is a right side elevation thereof.
FIG. 6 is an end view thereof.
FIG. 7 is perspective view of the sleeve similar to FIG. 1 but with the sliding gates closed.
Figure 8:
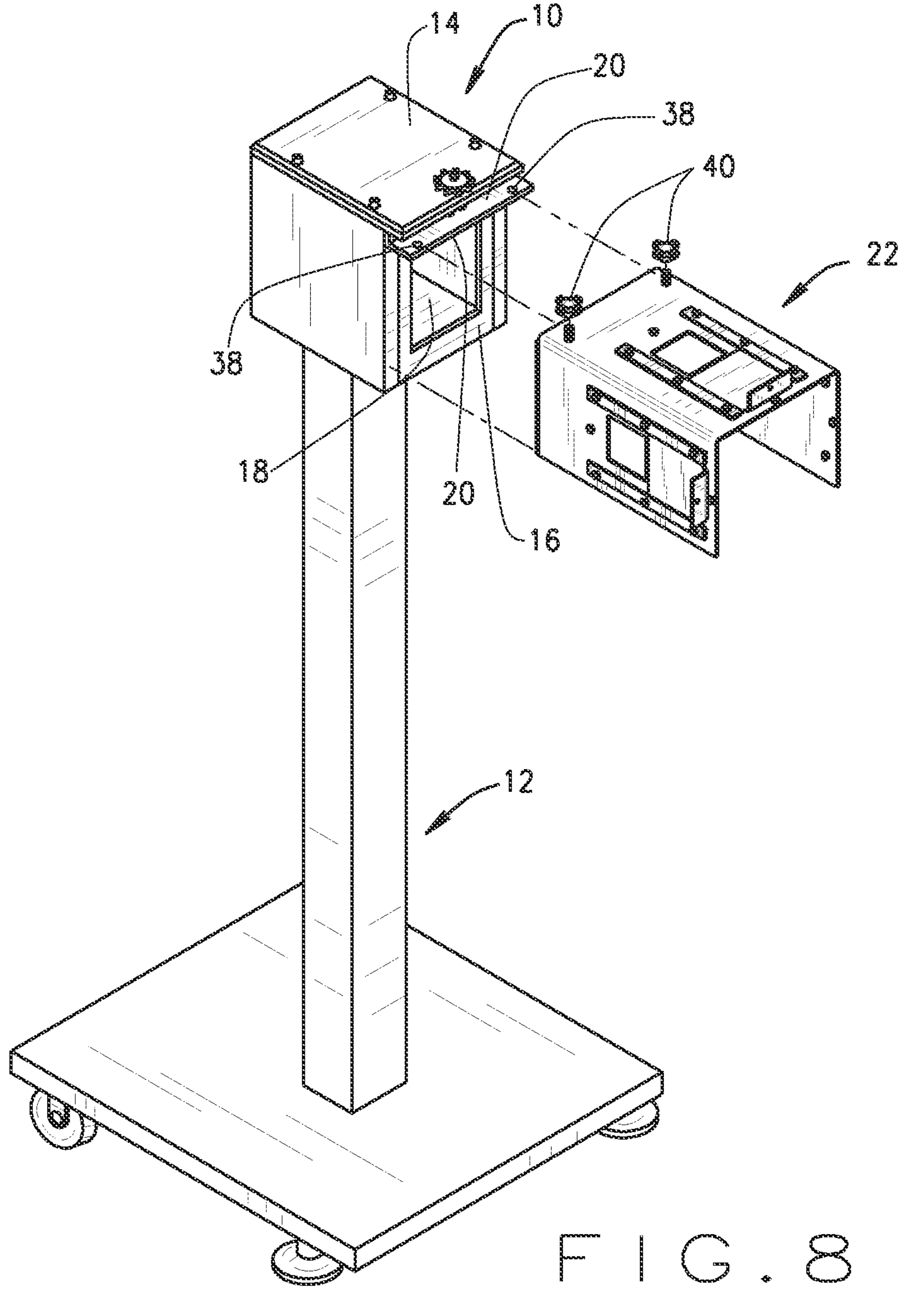
FIG. 8 is a perspective view of the sleeve exploded from a metal firebox mounted on a stand.
Figure 9:
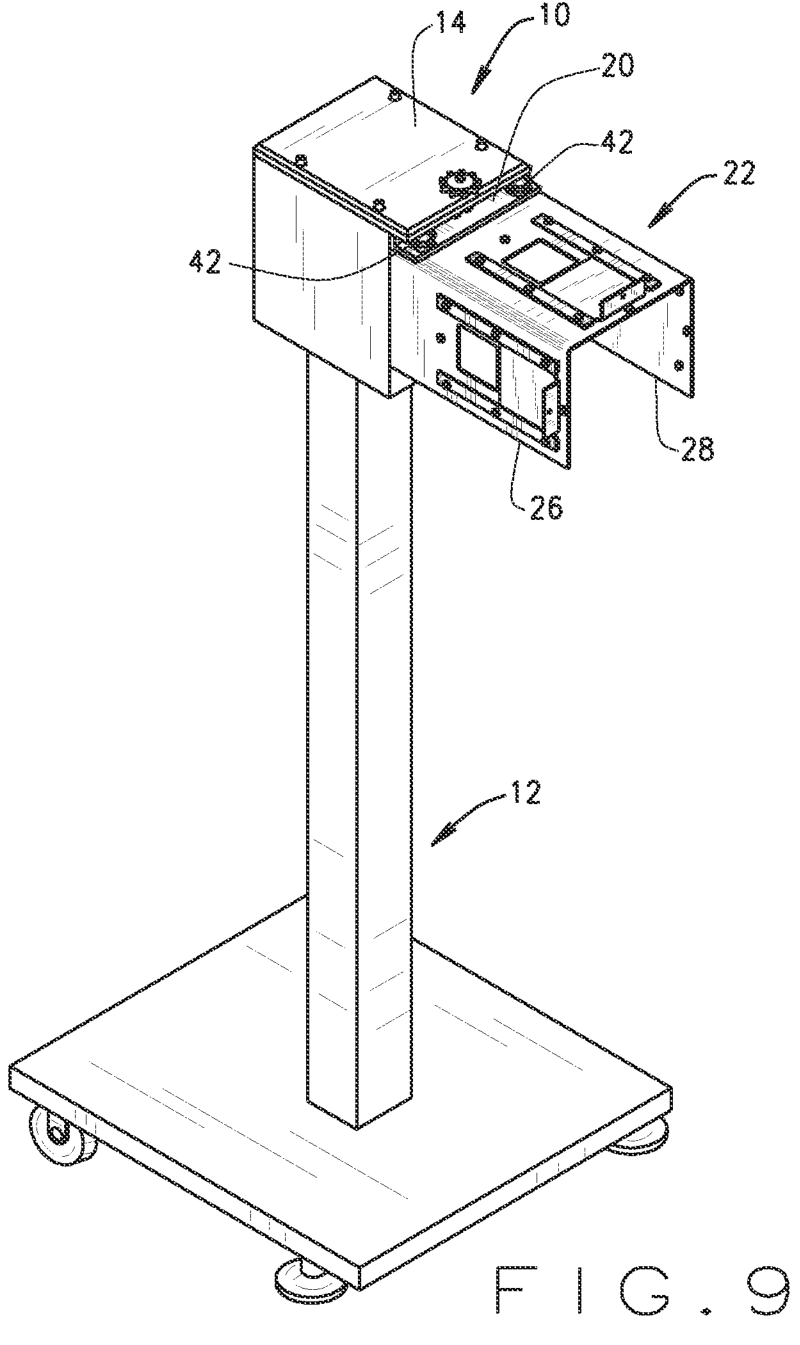
FIG. 9 is an assembled view of the sleeve mounted on the metal firebox; and, FIG. 10 is detail showing the sleeve mounted on the metal firebox.

Referring to the drawings more particularly by reference character, a metal firebox 10 is shown mounted on a stand 12 in FIGS. 8 and 9. Firebox 10 is an enclosed structure with a removable top 14 through which combustible material may be inserted. Firebox 10 has a front wall 16 with a door opening 18 and may have at least one window opening with a slidable closure (not shown). In the form shown in FIGS. 8-10, front wall 16 of firebox 10 has a peripheral flange 20 positioned above the door opening 18 for confining smoke coming out of the firebox.

Turning now to FIGS. 1-7, a sleeve 22 is shown configured for attachment to front wall 16 of firebox 10 above door opening 18. Sleeve is U-shaped with a top wall 24 and depending first and second sidewalls 26, 28. Top wall 24 has at least one opening 30 with a closure such as a sliding gate 32. In similar manner at least one but preferably both of first and second sidewalls 26, 28 is provided with at least one opening 34 with a closure such as a sliding gate 36. Sleeve 22 may include a bottom wall (not shown) but is preferably open at the bottom such that door opening 18 is more easily reached for closure during a demonstration.

Figure 10:
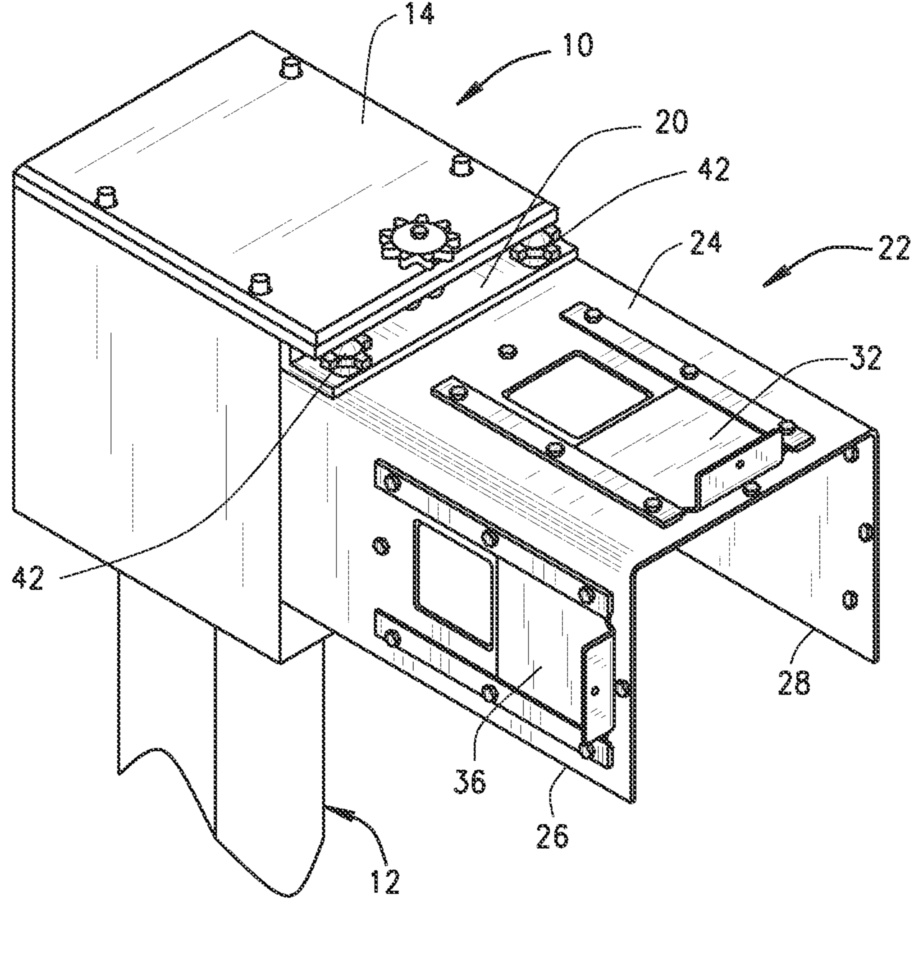

As shown in FIGS. 8-10, top wall 24 of sleeve 22 is attached to flange 20. While shown as hung from the underside, sleeve 22 could be supported on flange 20. A first end of top wall 24 and sidewalls 26, 28 abut front wall 16 of firebox 10 without a significant air gap. With continuing reference to FIGS. 8-10, flange 20 has apertures 38 (FIG. 8) aligned with corresponding apertures 40 (FIG. 3) in top wall 24 for receipt of threaded fasteners 42. While other attachment configurations are possible, the illustrated attachment permits the easy attachment and detachment of sleeve 22 from firebox 10 for transport.

In use, sleeve 22 may be used with fire box 10 to demonstrate the consequence of opening and closing the apertures in the top wall 24 or sidewalls 26, 28 together with the effect of direct or indirect water application to a fire. Opening and closing of door opening 18 and any window openings in firebox 10 may also be demonstrated. During all of these showings, sleeve 22 may be effectively coordinated with thermal imaging training.

In an Information Disclosure Statement filed herewith are highlights from the Euro Firefighter 2009. Highlighted sections show needs that are satisfied with sleeve 22 including showing thermal imaging fire behaviors in a controlled environment. The latter being important as many community fire departments have thermal imaging cameras but are insufficiently trained to use them effectively. For that training, firebox 10 and sleeve 22 are field available on a cost conscious basis as they are easily moved and stored. Also filed herewith in the Information Disclosure Statement is an Insight Training Tactical Firefighting Thermal Imaging Course Manual. Sleeve 22 satisfies all objectives listed in the manual.

In view of the above, it will be seen that the object of the invention is achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A sleeve for attachment to an enclosed metal firebox having a door opening in a front wall and an openable top through which combustible material may be inserted, said sleeve comprising a U-shaped member with a top wall and depending first and second side walls, said U-shaped member being open at the bottom and open at a first end and a second end, said top wall configured for attachment to the front wall of the firebox above the door opening with a first end of top wall and a first end of the first and second side walls abutted against the front wall of the firebox without a significant air gap, said top wall having at least one opening with a removable or slidable closure and at least one opening in at least one of the first and second side walls with a removable or slidable closure.

2. A sleeve for attachment to an enclosed metal firebox having a door opening and an openable top through which combustible material may be inserted, a peripheral flange on a front wall of the firebox positioned above the door opening, said sleeve comprising a U-shaped member with a top wall and depending first and second side walls, said U-shaped member being open at the bottom and open at a first end and a second end, said top wall configured for attachment to the peripheral flange with a first end of top wall and the first and second side walls abutted against the side of the firebox without a significant air gap, the top wall including at least one opening with a removable or slidable closure and at least one opening in at least one of the first and second side walls with a removable or slidable closure.

* * * * *